Jan. 18, 1966   R. BECK   3,230,347
ELECTRIC HEATING APPLIANCES
Filed June 10, 1963
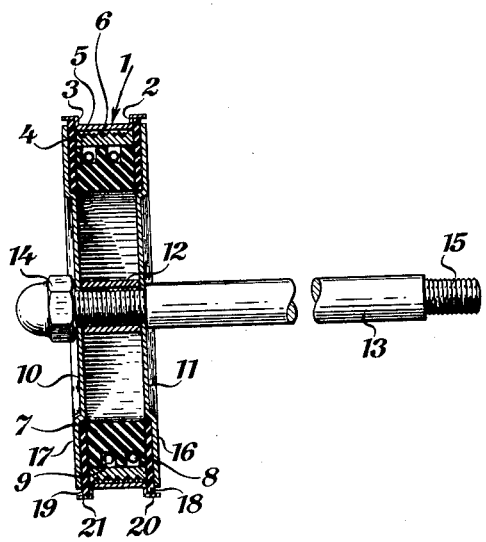
INVENTOR.
RUDOLPH BECK
BY Bair, Freeman & Molinare
Attys United States Patent Office 3,230,347
Patented Jan. 18, 1966

3,230,347
ELECTRIC HEATING APPLIANCES
Rudolf Beck, Konigstein, Taunus, Germany
Filed June 10, 1963, Ser. No. 286,854
Claims priority, application Germany, June 15, 1962,
Z 9,462
12 Claims. (Cl. 219—469)

The invention relates to an electric heating appliance for heating materials, such as, for example, synthetic fibres prior to stretching.

Before or during stretching, it is usual to lead synthetic fibres over a heater and to warm them. When this is done, it is extremely important, if the fibres are to be correctly stretched, for the heat absorbed by the fibres to be kept constant, which means that the surface temperature of the heater must be maintained at a definite pre-determined level. Even slight fluctuations in the surface temperature, such as may arise from uneven heating, for instance, are attended by undesirable results.

It is therefore important that the heat supply to the heater should be kept substantially constant. On the other hand, however, it must be possible to vary the heat supply and adapt it to any changes that may occur in the surrounding conditions. One frequently arising condition that entails modification of the temperature conditions, such as must be counteracted by the heater with the briefest possible delay, occurs when the heating process is interrupted—for example, when the thread breaks or when production is temporarily held up—the surface temperature then rising a certain amount, which corresponds to the heat otherwise absorbed by the thread. Thus, for instance, the working temperature may be in the neighbourhood of 150° C. and the temperature of the heater may increase to 200° C. Trouble then arises when production is resumed and the thread has to be placed on the heater while it is at this higher temperature. Generally speaking, what happens is that the thread sticks to the surface of the heater on account of the high temperature, with the result that the thread breaks and there is a further halt in the flow of production. With the thread running at high speed (between 100 and 500 yards a minute), this involves considerable waste of material on every occasion. These difficulties occur with a great many of the heaters in use hitherto.

Heaters already exist which, it is claimed eliminate the difficulties just mentioned. These existing appliances are oil-heated, the oil being brought up to the temperature required for the particular stretching process and then circulated through the various heating elements in the appliance. The cost involved in running the pipes needed and in producing the heat itself is comparatively high, especially since the heat-conductive parts of this equipment are necessarily made oversized, so as to keep the superficial temperature of the heating surface largely independent of heat losses.

In another existing heater, which is electrically operated, an attmept is made to keep the temperature of the heating elements constant over long periods by virtue of heat stored in the elements themselves. These have therefore to be of large thermal capacity. The disadvantage of this existing appliance, however, is that it has to be switched on for a long time before the requisite surface temperature is reached. In addition, there is a risk of using too high a setting, that is to say exceeding the proper temperature.

An electrically operated heater has already been described elesewhere in which the heat supply is regulated by a measuring resistor fitted within the heater. This measuring resistor undergoes changes whenever the temperature varies, whereupon the resistor operates through an appropriate circuit to modify the supply of heat to the heating appliance.

The regulation of the heater to which the invention relates is likewise based on the principle mentioned above.

According to the present invention ,an electric heating appliance comprises an outer layer forming a heating surface, an intermediate layer, a measuring resistor supported on said intermediate layer, an inner layer and a heating resistor supported on said inner layer, said layers being disposed concentrically. The layers should preferably be cemented solidly inside one another, with any spaces enclosed between the rings packed with heat-conductive, electrically insulating material. It is best for the outer layer or member of the heater, across the surface of which the thread is drawn, to be as thin-walled as possible. Immediately under this outer layer, the temperature responsive resistor for regulating the heater temperature is mounted on that face of the intermediate layer which is adjacent to the outer layer. The intermediate layer or member is desirably provided with a spiral groove to accommodate the temperature responsive resistance wire. This resistor is bedded in the spiral groove in the intermediate layer with a heat-conductive, electrically insulating material.

The point of fundamental importance is the provision of good heat transmission between the individual layers along with good electrical insulation. This is because temperature changes in the outer layer must be detected at once by the temperature responsive resistor, the changes in which latter bring about a reduction or an increase in the heat output from the heating resistance wire. This change must in turn be transmitted to the outer layer with the briefest possible delay. This purpose is achieved in the appliance proposed by the invention.

The advantage of the appliance to which the invention relates is that the temperature is rapidly adjusted to a constant level whenever heat is extracted, there being little storage of heat. The weight and dimensions of the appliance are comparatively small, so that little heating-up is required.

One embodiment of the invention will now be described by way of example, reference being made to the accompanying drawing, which shows a heating appliance in cross-section.

In accordance with the invention, the appliance illustrated comprises three concentric members. The outer member 1 is of thin-walled material of good heat-conducting properties. In cross-section, the outer heating member 1 is U-shaped, having axially spaced radially outwardly extending flanges 2 and 3 serving to define the track over which the material that is to be heated (a synthetic fibre, for example) is run, so that the thread may not slip off the heating surface as it runs round. The shape of the cross-section shown also gives the outer member 1 increased stability and so enables the walls to be made extremely thin.

Concentrically within the outer heating member 1 there is disposed an intermediate member 4 carrying on its outer cylindrical face a temperature responsive measuring resistor 5. The measuring resistor 5 should preferably take the form of a wire, evenly wound several times around intermediate member 4. In the example shown in the drawing, this wire lies in grooves 6, which are triangular in section and resemble a screw-thread. However, the measuring resistor 5 may also be designed otherwise—for example, as a strip of metal of the width of outer member 1.

To ensure good heat transmission between outer member 1 and intermediate member 4 with the measuring resistor 5, the measuring resistor 5 may be bedded in the threadlike groove 6 with a heat-conductive, electrically insulating material. Aluminum oxide, for example, mixed with a cement, is suitable for this purpose. The entire cross-section of the groove should be filled with this material, to provide good heat-conducting contact between the two members.

An inner member 7 is disposed concentrically within the member 4 and supports a heating resistor 8. That face of the inner member 7 which lies towards the intermediate member is formed with a groove 9 resembling a screw-thread. In the example illustrated, this groove is rectangular in section and serves to accommodate the heating spiral 8. The empty spaces left in the groove 9 should likewise be filled with a heat-conductive, electrically insulating material. All three members 1, 4 and 7 are solidly cemented together, good heat transmission and exchange being thereby ensured between all parts.

The intermediate member 4 may be made from any suitable material that is a good conductor of heat. It is suggested, however, that it should be formed from aluminum or an aluminum alloy and that its surface should be coated with an electrically non-conductive layer deposited by the anodising process. The advantage of making up the intermediate member in this way is that the electrically conductive wire used for the measuring resistor 5 may be wound on without special insulation. It is also, possible, however to give a heat-conductive, electrically insulating coating to the wire of the measuring resistor 5, instead of to the intermediate member 4. Anodised aluminum wires, for instance, are of this nature.

In making the measuring resistor 5, an even distribution of the turns over the surface of the intermediate member 4 is important, as is also keeping the gap between the resistor 5 and the outer member 1 as small as possible, in order that every fluctuation in the temperature of the latter may be detected immediately at any point on the surface. Any departure of the temperature from the correct level will be translated by the measuring resistor 5 into a change in the heat output of the heating wire 8.

The heating wire 8, which may consist of a material with a low temperature coefficient, is suitably of spiral form, because a resistor so wound can readily be given a predetermined value before it is fitted. However, the heating wire 8 may also have any other suitable cross-section. The inner member 7, which supports the heating wire 8, should preferably consist of an electrically insulating material which may be porous. The material marketed under the proprietary name of Ergan, for example, is suitable for this purpose, or a sintered material such as that known by the trade name of Steatit. The inner member 7 may also be made from a metal, however, such as aluminum or an aluminum alloy, coated by the anodising process with a layer of electrically insulating material. Again, in place of an insulating layer on the inner member 7, the heating wire 8 may be coated with a heat-conductive electrically insulating film.

The members 1, 4 and 7 are held together and centralised on both sides by means of circular plates 10 and 11. These plates are mounted on a threaded bolt 13 and held in place by a nut 14. The distance between the plates 10 and 11 is determined by a spacing sleeve 12. The free end 15 of the bolt 13 also carries a screw thread, to enable the appliance to be fixed in a desired position.

Adjacent the members 1, 4 and 7 the plates 10 and 11 have axially raised rims 16 and 17, for centering the rings. Ringshaped insulators 18 and 19, consisting for example of mica or the like, are fitted between the opposing faces of the members and the plates. At their outer edges, these insulators 18 and 19 are held in place by the turned over edges, 20 and 21, of the flanges 2 and 3 of the outer member 1. To prevent the plates 10 and 11 from coming into contact with the outer member 1 the overall diameter of the plates is somewhat smaller than that bounded by the edges 20 and 21 so that an annular gap is left between plates 10 and 11 on the one hand and the outer member 1 on the other.

I claim:

1. An electric heating appliance comprising an inner annular member, a spirally wound resistive electric heating element disposed in a groove in the external face of said inner member, an intermediate member of heat conducting material disposed concentrically around said inner member in heat conducting relationship thereto, a temperature sensitive resistor spirally wound in an external groove in said intermediate member and electrically insulated therefrom, a heat conducting cement filling said groove in said intermediate member, and a thin-walled annular outer member disposed concentrically around said intermediate member in heat conducting relationship to define a heating surface.

2. An electric heating appliance according to claim 6 wherein said outer member is formed with axially spaced radially outwardly extending end flanges.

3. An electric heating appliance according to claim 1 including axially spaced end plates to retain said inner, outer and intermediate members, a spacer element between said end plates and fastening means for retaining said end plates in an assembled condition.

4. An electric heating appliance comprising an inner annular member, a first spiral groove in the external cylindrical face of said inner member, a resistive electric heating element in said first groove, an intermediate annular member of heat conducting material disposed concentrically around said inner member in heat conducting relationship thereto, a second spiral groove in the external cylindrical face of said intermediate member, a temperature sensitive resistor wound in said second groove in heat conducting relationship to with said intermediate member and electrically insulated therefrom, a heat conducting electrically insulating packing in said second groove, a thin walled outer annular member of heat conducting material disposed concentrically about said intermediate member in heat conducting relationship therewith and formed with radially outwardly extending axially spaced flanges so as to be substantially of U-section in a diametral plane, outwardly turned end flanges on said radial flanges, electrically insulating rings disposed one on either side of the assembly of inner, outer and intermediate members and located against said radial flanges, end plates disposed one on either side of said assembly to bear against said insulator rings and spaced radially inwardly of said end flanges, spacer means disposed between said end plates and fastening means for maintaining said end plates in spaced relationship.

5. An electric heating appliance according to claim 4 wherein said fastening means is a nut and a bolt extending axially of the assembly and said spacer means comprises a sleeve disposed around said bolt.

6. An electric heating appliance according to claim 4 wherein said inner member is formed from electrically insulating material.

7. An electric heating appliance according to claim 4 wherein said inner member is at least largely composed of aluminium and is provide on its external cylindrical face with a film of electrically insulating material.

8. An electric heating appliance according to claim 7 wherein said film is an anodic film.

9. A synthetic fibre heating appliance comprising a thin walled outer annular member of heat conducting material and of low heat capacity having spaced radially outwardly extending walls defining therebetween a heating surface for the fibres, an annular intermediate member of heat conducting material disposed concentrically within said outer member in heat conducting relationship therewith, a first spiral groove formed in the external cylindrical face of the intermediate member, a temperature responsive resistor disposed in said first groove to respond to temperature changes in said heating surface, a heat conductive packing in said first groove, an inner annular member disposed concentrically within said intermediate member in heat conducting relationship therewith, a second spiral groove formed in the external cylindrical face of said inner member, an electric resistive heating element disposed in said second groove, a heat conductive packing in said second groove, and means for securing the inner, intermediate and outer member in assembled relationship.

10. In an electric heating appliance for heating synthetic fibers prior to stretching, said appliance comprising an outer annular member defining an outer substantially cylindrical heating surface over which said fibers are conducted, said outer annular member having heat conducting characteristics, interiorly and annularly of said resistor heating means mounted in heat conducting relationship with said outer annular member for heating said cylindrical fiber heating surface, and temperature measuring resistor means annularly interposed between and in heat conducting relationship with said outer annular member and said annular resistor heating means for detecting the temperature of the said heating surface and for controlling the electrical supply circuit for said resistor heating means in order to maintain the temperature of said fiber heating surface within close tolerances.

11. The device of claim 10 wherein said resistor heating means and said temperature measuring resistor means are carried by an annular, electrically insulating mass of high heat conducting properties.

12. An electric heating device for heating synthetic fibers prior to stretching, said appliance comprising an outer annular member defining an outer substantially cylindrical surface over which said fibers are conducted, said outer annular member having heat conducting characteristics, an inner annular member mounted interior of and in heat conducting relationship with said outer annular member, an annular resistor heating member carried by and in heating conducting relationship with said inner annular member, temperature measuring resistor means annularly interposed between said outer annular member and said inner annular member for detecting the temperature of said heating surface and for controlling the electrical supply for said resistor heating means so that the temperature of said fiber heating surface is held within close tolerances, both said resistor heating member and said temperature measuring resistor means being embedded within an electrically insulating, high heat conducting material for maintaining the elements of said appliance in heat conducting relationship.

References Cited by the Examiner
UNITED STATES PATENTS

| | | | |
|---|---|---|---|
| 2,222,817 | 11/1940 | Kline et al. | 34—48 |
| 2,575,113 | 11/1951 | Lennox | 219—262 X |
| 2,639,485 | 5/1953 | Ambler | 28—62 |
| 2,777,931 | 1/1957 | Bundegaard et al. | 219—470 |
| 2,790,884 | 4/1957 | Gilbert | 219—515 |
| 2,834,860 | 5/1958 | Claiborne et al. | 219—469 |
| 2,864,229 | 12/1958 | Seem et al. | 28—62 X |
| 3,020,383 | 2/1962 | Onishi et al. | 219—470 |
| 3,028,473 | 4/1962 | Dyer et al. | 219—501 |

RICHARD M. WOOD, *Primary Examiner.*

V. Y. MAYEWSKY, *Assistant Examiner.*